(12) United States Patent
Wilkins

(10) Patent No.: US 8,468,997 B2
(45) Date of Patent: Jun. 25, 2013

(54) INTERNAL COMBUSTION ENGINE WITH VARIABLE EFFECTIVE LENGTH CONNECTING ROD

(76) Inventor: Larry C. Wilkins, Ft. Lauderdale, FL (US)

( * ) Notice: Subject to any disclaimer, the term of this patent is extended or adjusted under 35 U.S.C. 154(b) by 272 days.

(21) Appl. No.: 12/850,674

(22) Filed: Aug. 5, 2010

(65) Prior Publication Data

US 2011/0030650 A1    Feb. 10, 2011

Related U.S. Application Data

(60) Provisional application No. 61/231,812, filed on Aug. 6, 2009.

(51) Int. Cl.
*F02C 7/06*    (2006.01)

(52) U.S. Cl.
USPC .................. 123/197.3; 123/197.1; 123/197.4; 123/78 E; 74/579 R; 29/888.09

(58) Field of Classification Search
USPC ...... 123/197.4, 197.3, 197.1, 78 E; 74/579 R; 29/888.09
See application file for complete search history.

(56) References Cited

U.S. PATENT DOCUMENTS

| | | | |
|---|---|---|---|
| 1,574,573 A | 2/1926 | Hale | |
| 1,875,180 A | 8/1932 | Rider | |
| 2,248,323 A * | 7/1941 | Anthony | 123/78 E |
| 2,252,153 A * | 8/1941 | Anthony | 123/78 E |
| 4,085,628 A | 4/1978 | McWhorter | |
| 4,152,955 A | 5/1979 | McWhorter | |
| 4,301,695 A | 11/1981 | Reiher | |
| 4,974,554 A * | 12/1990 | Emery | 123/48 B |
| 5,245,962 A * | 9/1993 | Routery | 123/197.3 |
| 5,636,561 A * | 6/1997 | Pecorari | 91/499 |
| 5,711,267 A | 1/1998 | Williams | |
| 5,724,863 A * | 3/1998 | Kramer et al. | 74/583 |

(Continued)

FOREIGN PATENT DOCUMENTS

| | | |
|---|---|---|
| DE | 103 09 650 A1 | 9/2004 |
| WO | WO 88/07620 A1 | 10/1988 |
| WO | WO 00/08325 A1 | 2/2000 |
| WO | WO 2004/053345 A1 | 6/2004 |

OTHER PUBLICATIONS

Co-pending U.S. Appl. No. 13/049,396, filed Mar. 16, 2011.
Co-pending U.S. Appl. No. 13/187,947, filed Jul. 21, 2011.

(Continued)

*Primary Examiner* — Noah Kamen
*Assistant Examiner* — Grant Moubry
(74) *Attorney, Agent, or Firm* — Finnegan, Henderson, Farabow, Garrett & Dunner, L.L.P.

(57) ABSTRACT

An internal combustion engine may include a cylinder block defining a cylinder, and a crankshaft defining a crankpin, wherein the crankshaft is rotatably received by the cylinder block and rotates about a longitudinal axis. The internal combustion engine may further include a piston configured to reciprocate within the cylinder, and a connecting rod operably coupled to the piston and the crankpin. The connecting rod may include a first rod element having a first distal end and a first proximate end, wherein the first distal end is operably coupled to the piston. The connecting rod may further include a second rod element having a second distal end operably coupled to the first proximate end of the first rod element, and a second proximate end operably coupled to the crankpin, wherein the first rod element and the second rod element are pivotally coupled to one another.

47 Claims, 17 Drawing Sheets

U.S. PATENT DOCUMENTS

| | | | |
|---|---|---|---|
| 5,979,375 | A | 11/1999 | Ballardini |
| 6,202,622 | B1 | 3/2001 | Raquiza, Jr. |
| 6,349,684 | B1 | 2/2002 | de Gooijer |
| 6,499,445 | B2 * | 12/2002 | Han .......................... 123/45 R |
| 6,510,831 | B2 | 1/2003 | Wiseman |
| 6,581,552 | B2 | 6/2003 | Kreuter |
| 7,028,647 | B2 | 4/2006 | Styron |
| 7,373,915 | B1 * | 5/2008 | Joniec ....................... 123/197.1 |
| 8,166,930 | B2 * | 5/2012 | Cho et al. .................... 123/48 B |
| 2007/0169739 | A1 * | 7/2007 | Meyer et al. ............... 123/197.4 |
| 2008/0115769 | A1 | 5/2008 | Mason |
| 2008/0184966 | A1 | 8/2008 | Marchisseau |
| 2010/0012095 | A1 | 1/2010 | Wilkins |

OTHER PUBLICATIONS

International Search Report issued Sep. 30, 2009, in PCT Application No. PCT/US2009/050493.

Written Opinion issued Sep. 30, 2009, in PCT Application No. PCT/US2009/050493.

* cited by examiner crankshaft 15 degrees crankshaft 31 degrees crankshaft 45 degrees crankshaft 60 degrees crankshaft 120 degrees crankshaft 174 degrees

INTERNAL COMBUSTION ENGINE WITH VARIABLE EFFECTIVE LENGTH CONNECTING ROD

RELATED APPLICATIONS

This application claims the benefit of priority under 35 U.S.C. §119(e) of U.S. Provisional Application No. 61/231,812, filed Aug. 6, 2009, the disclosure of which is incorporated herein by reference

FIELD OF THE DISCLOSURE

The present disclosure relates to internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is operably coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston and the cylinder forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) created between the axis of the connecting rod and the axis of the crankpin. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connection rod and the axis of the crankpin during the time of maximum force on the piston, efficiency of the work generated from the combustion process may be less than desired.

Thus, it may be desirable to provide an internal combustion engine with a configuration that improves the efficiency and/or increase power output of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to an internal combustion engine. The internal combustion engine may include a cylinder block defining a cylinder, and a crankshaft defining a crankpin, wherein the crankshaft is rotatably received by the cylinder block and rotates about a longitudinal axis. The internal combustion engine may further include a piston configured to reciprocate within the cylinder, and a connecting rod operably coupled to the piston and the crankpin. The connecting rod may include a first rod element having a first distal end and a first proximate end, wherein the first distal end is operably coupled to the piston. The connecting rod may further include a second rod element having a second distal end operably coupled to the first proximate end of the first rod element, and a second proximate end operably coupled to the crankpin, wherein the first rod element and the second rod element are pivotally coupled to one another.

According to another aspect, an internal combustion engine may include a cylinder block defining a cylinder, and a crankshaft defining a crankpin, wherein the crankshaft is rotatably received by the cylinder block and rotates about a longitudinal axis. The internal combustion engine may further include a piston configured to reciprocate within the cylinder, and a connecting rod operably coupled to the piston and the crankpin, wherein the connecting rod has a first distal end operably coupled to the piston and a second proximate end operably coupled to the crankpin. The first distal end and the second proximate end define an effective length of the connecting rod, and the connecting rod is configured such that the effective length of the connecting rod is variable.

According to still a further aspect, a power train may include an internal combustion according to any of the exemplary embodiments described herein, a transmission operably coupled to the engine, and a drive member configured to perform work, wherein the drive member is operably coupled to the transmission.

According to yet another aspect, a vehicle may include an internal combustion according to any of the exemplary embodiments described herein, a transmission operably coupled to the engine, and a drive member configured to perform work, wherein the drive member is operably coupled to the transmission.

Additional objects and advantages of the disclosure will be set forth in part in the description which follows, and in part will be obvious from the description, or may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

DESCRIPTION OF EXEMPLARY EMBODIMENTS

Figure 1:
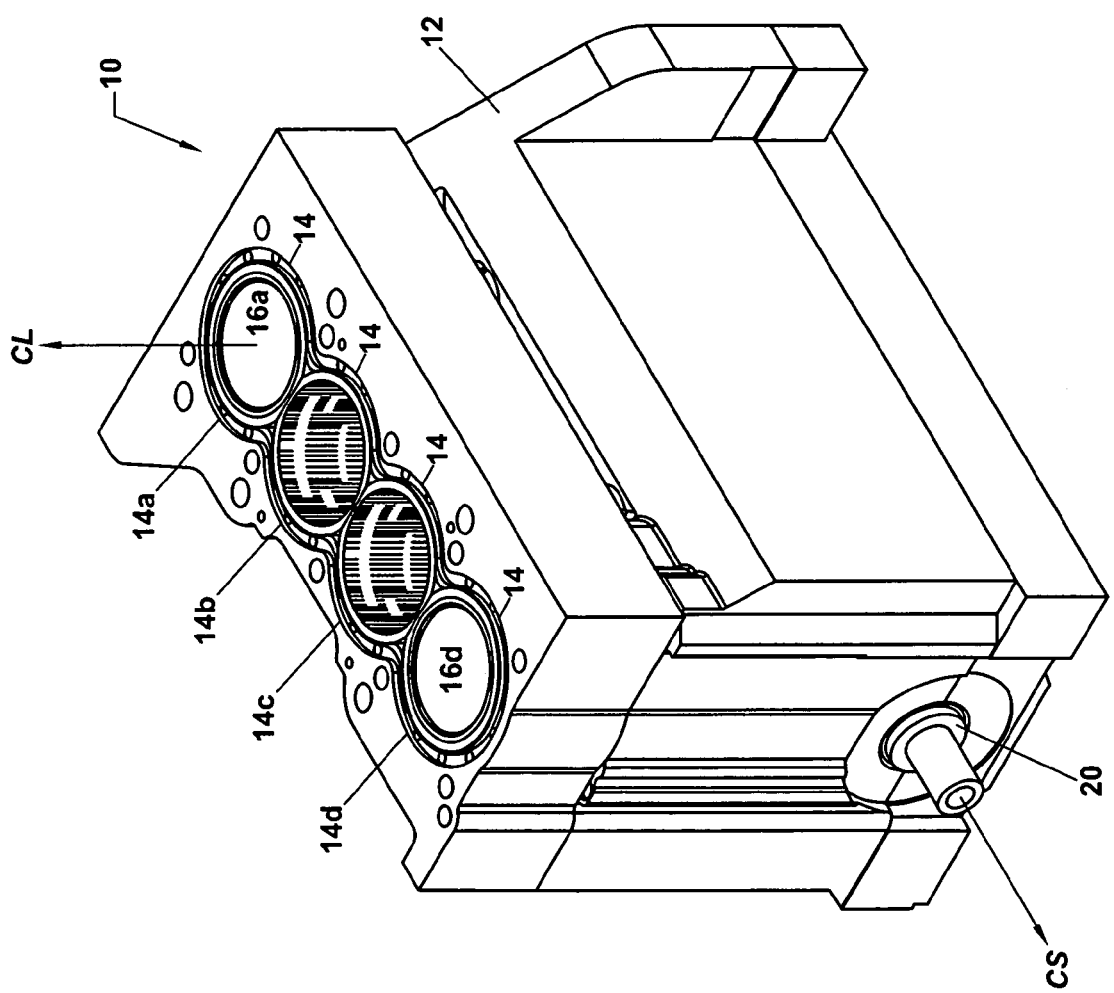
FIG. 1 is a schematic partial perspective view of an exemplary embodiment of an internal combustion engine.

Reference will now be made in detail to exemplary embodiments. Wherever possible, the same reference numbers are used in the drawings and the description to refer to the same or like parts.

FIGS. 1-17 schematically illustrate an exemplary embodiment of an internal combustion engine 10. In the exemplary embodiment shown, exemplary engine 10 is a reciprocating-piston internal combustion engine. As shown in FIG. 1, engine 10 includes a cylinder block 12 defining a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation.

Figure 2:
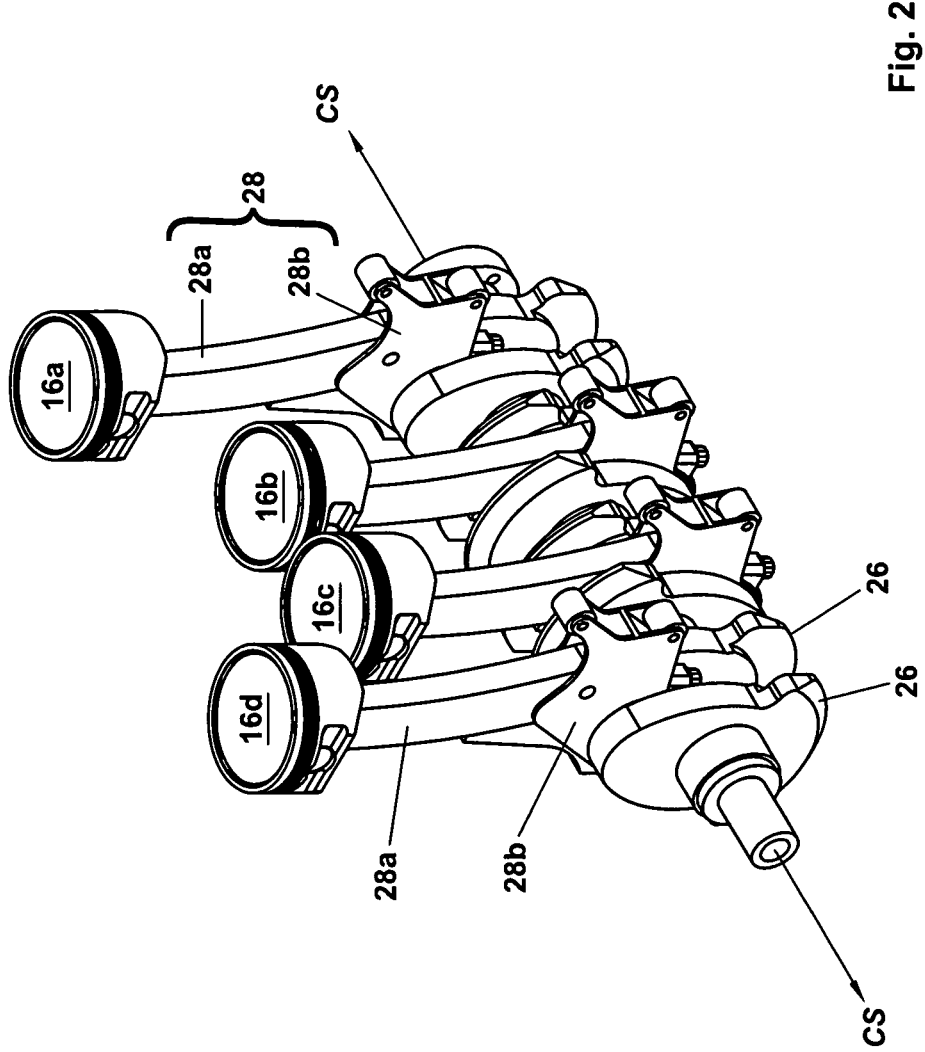
FIG. 2 is a schematic partial perspective view of a portion of the exemplary embodiment shown in FIG. 1.

As shown in FIG. 1, exemplary engine 10 includes pistons 16 corresponding to cylinders 14, for example, four pistons 16a, 16b, 16c, and 16d (see FIGS. 1 and 2). As shown in FIG. 1, pistons 16a and 16d are positioned in the upper end (i.e., "upper" being relative to the orientation of engine 10 shown in FIG. 1) of cylinders 14a and 14d, respectively, while pistons 16b and 16c are not visible in FIG. 1 due to being positioned lower in the cylinders 14b and 14c, respectively (see FIG. 2). To the extent that the relative positions of the pistons 16 in the cylinders 14 indicate a relative firing order of engine 10 (i.e., the sequential order of combustion events as identified by cylinders), exemplary engine 10 may be configured to have a different firing order, as is known to those skilled in the art.

Cylinder block 12 of exemplary engine 10 defines a number of bearings for receiving a crankshaft 20 (see FIG. 3), such that crankshaft 20 may rotate relative to cylinder block 12 about a longitudinal axis CS defined by crankshaft 20. For example, as shown in FIG. 3, crankshaft 20 defines a number of journals 22 corresponding to the number of bearings (not shown) defined by cylinder block 12, and journals 22 are received by bearings, such that crankshaft 20 may rotate about longitudinal axis CS.

Figure 3:
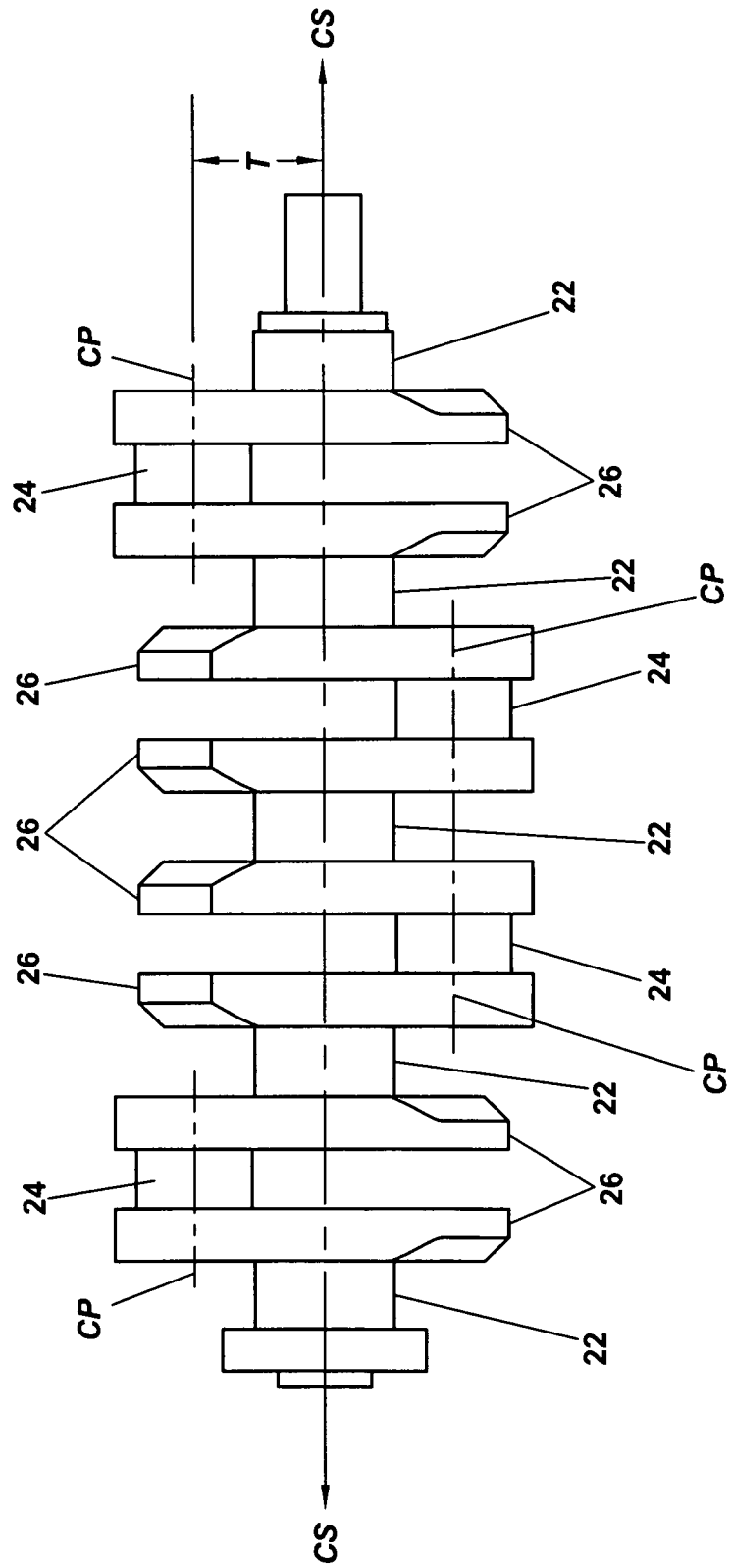
FIG. 3 is a schematic side view of an exemplary embodiment of a crankshaft for the exemplary engine.

Exemplary crankshaft 20, as shown in FIG. 3, also defines a number of crankpins 24 corresponding to the number of pistons 16. Crankpins 24 are circular in cross section, and the respective circular cross-sections may define a center C (see, e.g., FIGS. 6 and 7), which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T (see FIG. 7) from the longitudinal axis CS of crankshaft 20. Crankshaft 20 may also include a number of counterbalance weights 26 for providing (or improving) rotational balance of crankshaft 20 when assembled with pistons 14 and connecting rods.

Figures 4A, 4B:
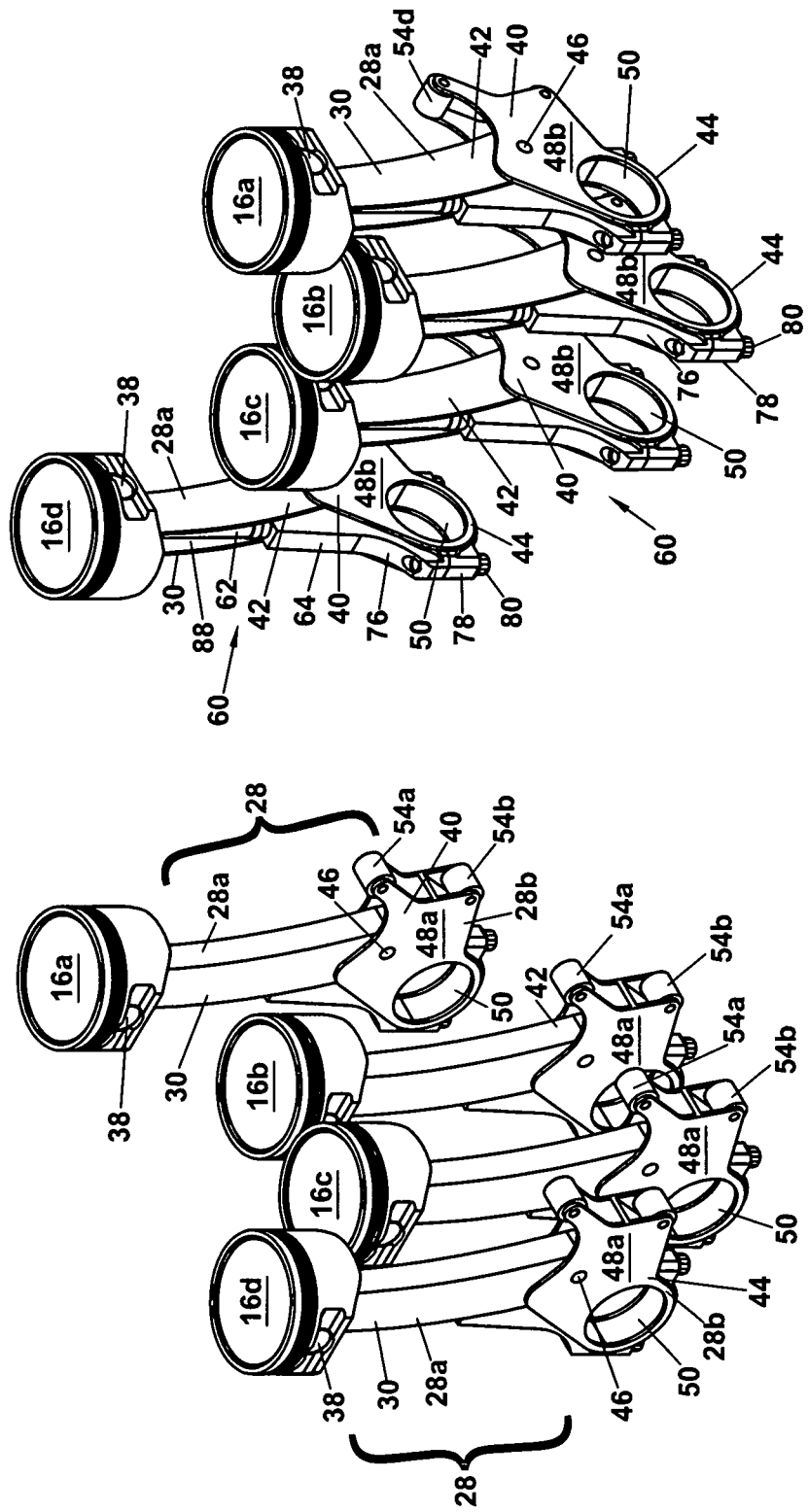
FIG. 4A is a schematic partial perspective view from a first perspective of a portion of the exemplary embodiment shown in FIG. 1.
FIG. 4B is a schematic partial perspective view from a second perspective of a portion of the exemplary embodiment shown in FIG. 1.
Figure 5:
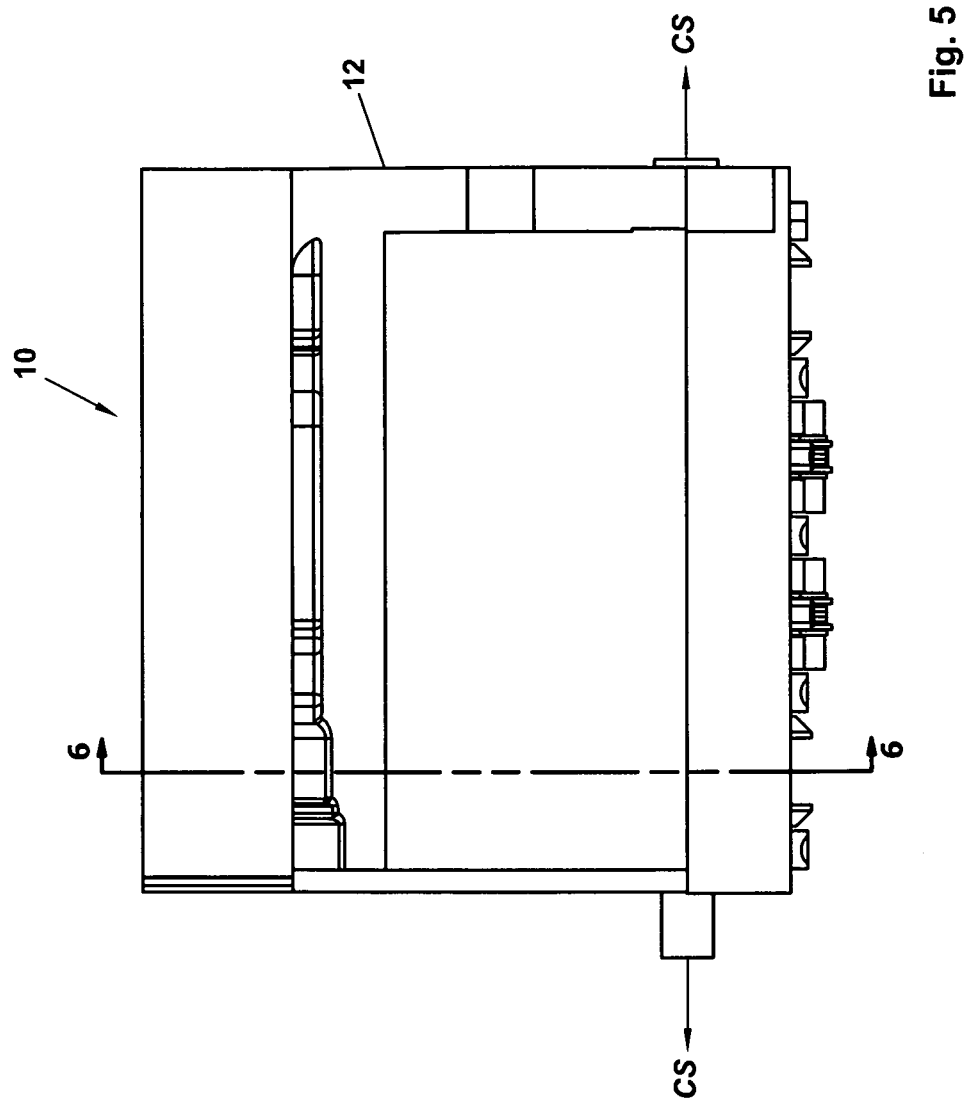
FIG. 5 is a schematic side view of the exemplary embodiment shown in FIG. 1.

Referring to FIGS. 4A and 4B, in exemplary engine 10, pistons 16 are operably coupled to crankshaft 20 via a number of connecting rods 28 corresponding to the number of pistons 16. In particular, exemplary connecting rods 28 include a first rod element 28a and a second rod element 28b. According to some embodiments, first rod element 28a is slightly curved (i.e., downward and to the left as shown in FIGS. 4A and 7-17) in order to provide clearance with internal surfaces of cylinder block 12. According to some embodiments, first rod element 28a is straight and cylinder block 12 may be configured to provide clearance for first rod element 28a.

In the exemplary embodiment shown in FIGS. 4A and 4B, a distal end 30 of first rod element 28a defines a first end aperture 32 (see FIGS. 7-17) for operably coupling first rod element 28a of connecting rod 28 to piston 16 via, for example, a pin 38. A distal end 40 of second rod element 28b is operably coupled to a proximate end 42 of first rod element 28a, and a proximate end 44 of second rod element 28b is operably to crankshaft 20 at crankpin 24. First rod element 28a and second rod element 28b are coupled to one another such that first rod element 28a and second rod element 28b are permitted to pivot with respect to one another. For example, first rod element 28a and second rod element 28b are coupled to one another via a pin 46 such that they are coupled to one another in a hinge-like manner.

According to the exemplary embodiment shown, second rod element 28b includes two plates 48a and 48b that sandwich first rod element 28a (see FIGS. 4A and 4B). Pin 46 extends between plates 48a and 48b through first rod element 28a, thereby operably coupling plates 48a and 48b to one another and to first rod element 28a. Exemplary plates 48a and 48b include apertures 50 configured to receive crankpin 24 of crankshaft 20. Thus, first rod element 28a and second rod element 28b serve to operably couple crankpin 24 of crankshaft 20 to piston 16, and first rod element 28a and second rod element 28b, by virtue of being pivotally coupled to one another in a hinge-like manner, can effectively alter the distance between the center C of crankpin 24 and piston pin 38 (i.e., connecting rod 28 has a variable effective length).

According the exemplary embodiment shown (see, e.g., FIGS. 6 and 7, which are schematic section views taken along line 6-6 of FIG. 5), engine 10 includes a surface 52 associated with an interior of cylinder block 12. Exemplary surface 52 is configured to cooperate with second rod element 28b such that pivoting motion of first rod element 28a relative to second rod element 28b may be affected (e.g., at least partially controlled). Thus, the cross-sectional profile of surface 52 and/or the configuration of second rod element 28b may be configured to increase efficiency and/or increase power output of engine 10.

As shown in FIGS. 4A and 4B, exemplary second rod element 28b includes two followers 54a and 54b configured to contact, either intermittently or continuously, surface 52 as crankshaft 20 rotates (e.g., see FIGS. 7-17), thereby affecting the pivoting motion between first rod element 28a and second rod element 28b. As explained in more detail herein, affecting the pivoting motion between first rod element 28a and second rod element 28b may affect the effective length of connecting rod 28 (i.e., the distance between crankpin 24 and pin 38, which connects first rod element 28a and piston 16 to one another). One or more of followers 54a and 54b may be, for example, a roller follower. Although the exemplary embodiment shown includes two followers, other numbers of followers are contemplated, including, for example, one or three followers. Further, types of followers other than roller followers are also contemplated.

Exemplary surface 52 may be defined by an interior surface of cylinder block 12 and/or a cam member operably coupled within cylinder block 12. For example, the interior surface of cylinder block 12 may define a cross-sectional profile 56 that may include one or more rectilinear and/or curvilinear portions, such as exemplary curvilinear portions 58a, 58b, and 58c, and rectilinear portion 58d, as shown in FIGS. 7-17. As mentioned above, cross-sectional profile 56 may be tailored to cooperate with followers 54a and/or 54b of second rod element 28b, such that efficiency and/or power output of engine 10 may be increased.

According to some embodiments, a portion, or the entirety, of surface 52 may be provided by an insert operably coupled within cylinder block 12. For example, at least a portion of surface 52 may be formed on a cam member (not shown) that is operably coupled within cylinder block 12. According to some embodiments, the cam member may be configured such that its orientation relative to cylinder block 12 may be altered and/or the cross-sectional profile of the cam member may be altered, for example, during operation of engine 10. Such alteration(s) may be implemented, for example, hydraulically, pneumatically, and/or electrically (e.g., via solenoid operation). Such alterations may be used to facilitate alteration of interaction between surface 52 and second rod element 28b (i.e., via exemplary followers 54a and 54b). Such embodiments may facilitate tailoring of engine operation characteristics, for example, to increase efficiency and/or power output in response changing demands of engine operation due, for example, to changing driving conditions of a vehicle in which engine 10 is operating.

Figure 6:
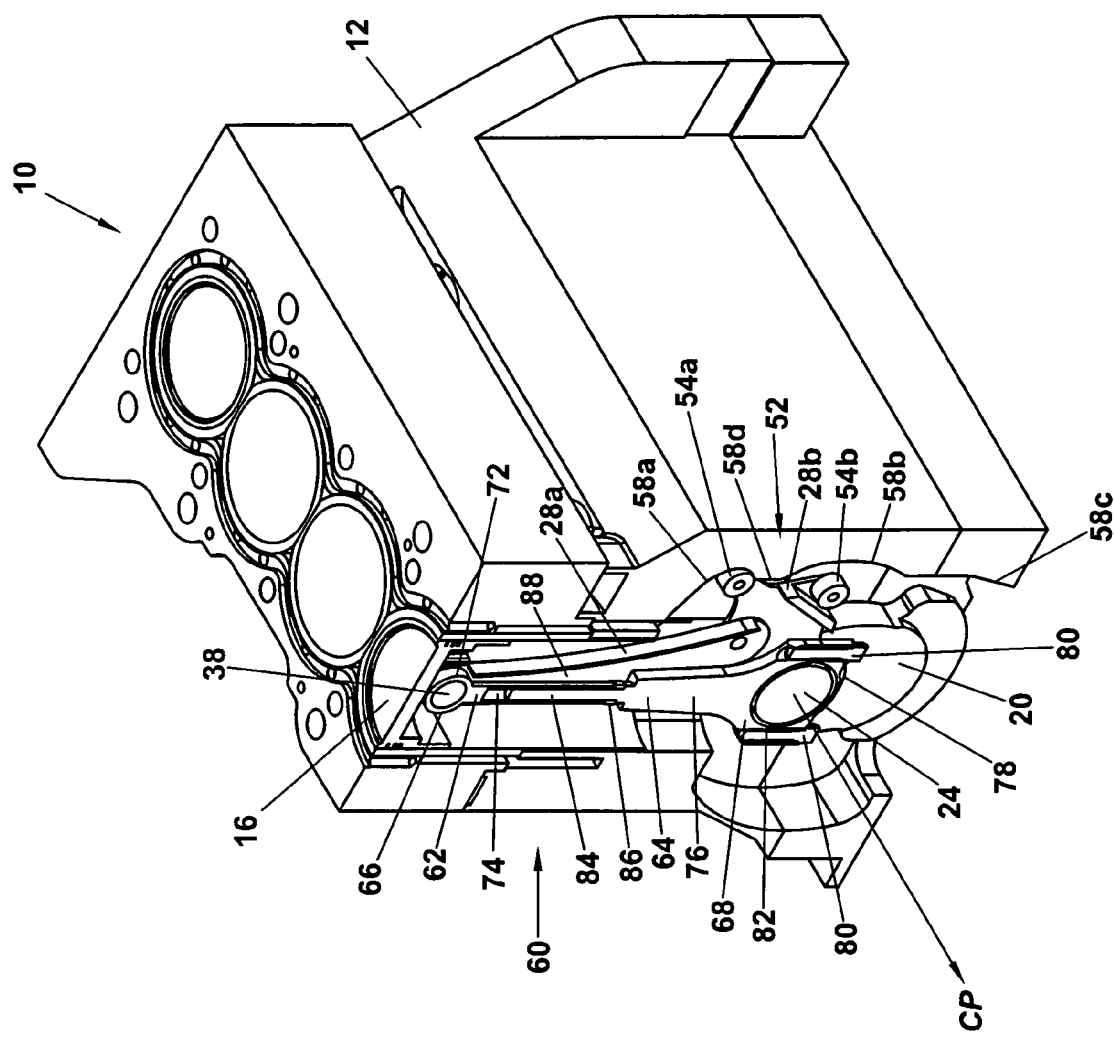
FIG. 6 is a schematic perspective section view of the exemplary embodiment shown in FIG. 1.

Exemplary engine 10 includes a travel limit assembly 60 configured to the confine the length of the stroke of piston 16 between an extended limit and a contracted limit (see, e.g., FIG. 6). For example, travel limit assembly 60 includes a first limit member 62 and a second limit member 64. First limit member 62 includes a distal end 66 operably coupled to piston 16 and/or first rod element 28a. Second limit member 64 includes a proximate end 68 operably coupled to crankpin 24 of crankshaft 20 and a distal end 70 operably coupled to first limit member 62. First limit member 62 and second limit member 64 are coupled to one another such that the length of travel limit assembly is variable between a minimum extent (see, e.g., FIG. 15) and a maximum extent (see, e.g., FIG. 7).

For example, as shown in FIG. 6, distal end 66 of first limit member 62 defines an aperture 72 configured to receive pin 38 and be operably coupled to piston 16 and/or distal end 30 first rod member 28a. First limit member 62 includes a tubular portion 74 extending from distal end 66. Second limit member 64 includes a body portion 76 and a cap 78 configured to be coupled to body portion 76 via, for example, bolts 80. Body portion 76 and cap 78 define an aperture 82 configured to receive crankpin 24 of crankshaft 20. Exemplary body portion 76 includes an extension 84 configured to be received in tubular portion 74 of first limit member 62. In this exemplary configuration, first limit member 62 and second limit member 64 are coupled to one another in a telescoping manner. Extension 84 defines a stop 86, for example, a shoulder, configured to limit the extent to which extension 84 extends into tubular portion 74. According to an alternative embodiment (not shown), second limit member 64 may include a tubular portion and first limit member 62 may be configured to extend into the tubular portion of second limit member 64.

In the exemplary embodiment shown, when assembled, connecting rod 28 and travel limit assembly 60 are assembled in pairs corresponding to a common piston 16 and a common crankpin 24 (see, e.g., FIGS. 4B and 6), such that each connecting rod-travel limit assembly pair is operably coupled to the same piston 16 and the same crankpin 24. First rod element 28a of connecting rod 28 is configured to provide clearance for travel limit assembly 60, such that travel limit assembly 60 can be operably coupled to the same piston 16 as connecting rod 28 of the connecting rod-travel limit assembly pair. For example, first rod element 28a defines a space 88 through which first limit member 62 extends (see, e.g., FIGS. 4B and 6).

During operation of exemplary engine 10, as crankshaft 20 rotates, crankpins 24 revolve around crankshaft longitudinal axis CR, such that crankpin centers C define a circular path having a radius defined by the distance T defined along a radial axis RA (see FIGS. 7-17) extending between the longitudinal axis CS of crankshaft 20 and the longitudinal axis CP of the respective crankpins 24. Thus, apertures 50 of second rod element 28b, which are rotatably coupled with respect to crankpins 24, also revolve about the crankshaft axis CS. Distal end 30 of first rod element 28a of connecting rod 28 is constrained to move in a reciprocating and linear manner due to being operably coupled to pistons 16, which are likewise constrained to move in a reciprocating and linear manner within respective cylinders 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS.

During operation of a conventional engine, a piston reciprocates within the cylinder, such that during a power stroke of the internal combustion engine, combustion of an air/fuel mixture within a combustion chamber defined by the piston and the cylinder (and cylinder-head (not shown)) forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) extending between the axis of the connecting rod and the axis of the crankpin. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connection rod and the axis of the crankpin during the time of maximum force on the piston, efficiency of the work generated from the combustion process in a conventional internal combustion engine may be less than desired.

Exemplary engine 10 is configured to employ a strategy that delays any substantial movement of piston 16 toward crankshaft 20 during the power stroke, until crankshaft 20 has rotated to point at which there is a more effective moment arm between connecting rod axis CR and radial axis RA extending between crankshaft axis CS and a respective crankpin axis CP. As a result, a greater amount of the energy of the combustion event may be captured because the maximum force acting on piston 16 coincides with a greater moment arm, thereby resulting in more torque at crankshaft 20 during the power stroke.

FIGS. 7-17 schematically illustrate exemplary operation of engine 10 having exemplary connecting rod 28 and exemplary travel limit assembly 60, which serve to delay piston 16's travel at the beginning of the power stroke of exemplary engine 10. In particular, by allowing first rod element 28a and second rod element 28b to pivot relative to one another in a controlled manner, such that the distance between the center CP of crankpin 24 and the center of pin 38 (i.e., the effective length of connecting rod 28) may be selectively varied. Such an exemplary embodiment renders it possible to effectively hold piston 16 in cylinder 14 at a substantially fixed position for a short period of time, even as crankpin 24 continues to revolve around crankshaft 20's axis CS as crankshaft 20 rotates. As a result, it is possible to hold piston 16 at the point of highest compression in the combustion chamber while crankpin 24 revolves to a position in which there is an increased moment arm formed between an axis defined between pin 38, which operably couples first rod element 28a to piston 16, and pin 46, which operably couples first rod element 28a to second rod element 28b. In this exemplary manner, the delaying strategy outlined below may be implemented.

Figure 7:
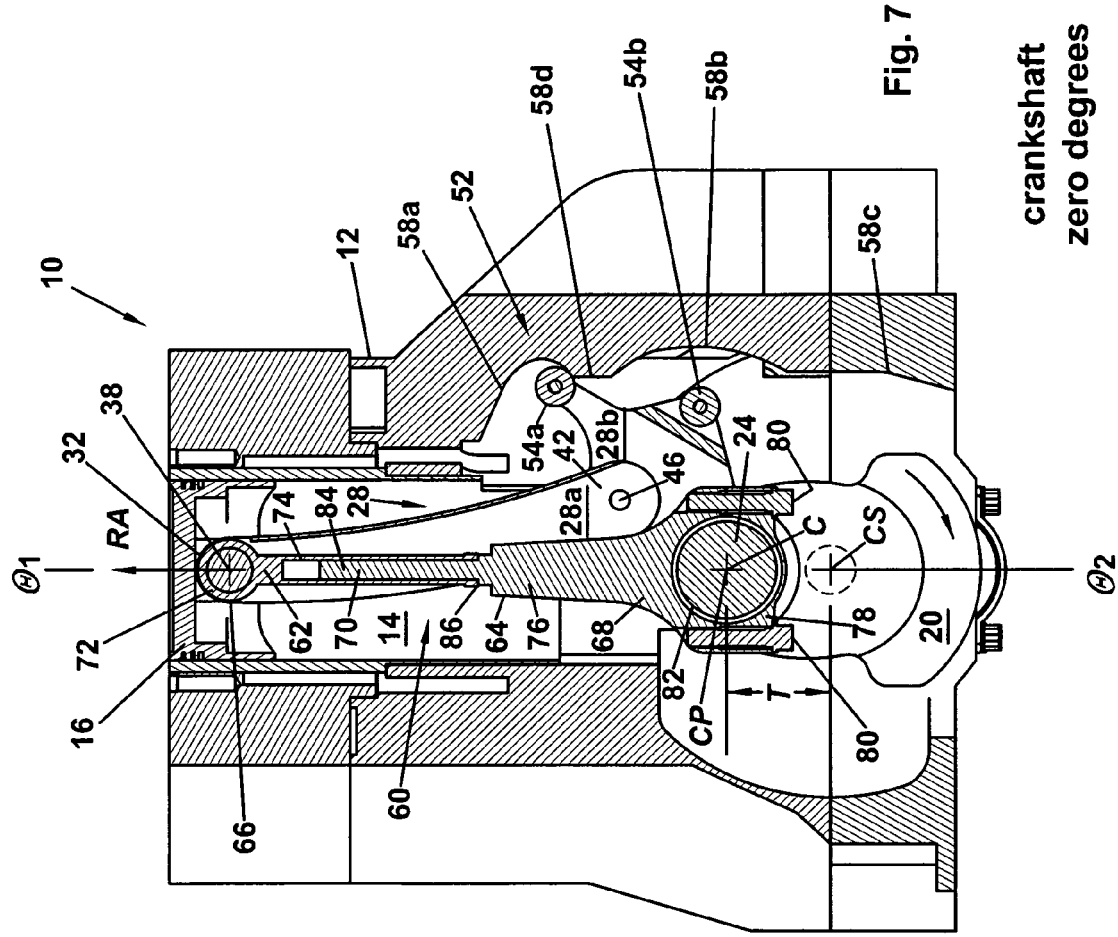
FIG. 7 is a schematic end section view of the exemplary embodiment shown in FIG. 1 with a radial axis angle of a crankshaft shown at 0 degrees.

For example, as shown in FIG. 7, crankshaft 20 is oriented such that radial axis RA defined by the center of crankshaft 20 and the center of crankpin 24 is oriented at zero degrees, which corresponds generally a first stroke termination angle $\theta_1$ that generally coincides with the end of the compression stroke of exemplary engine 10. Thus, with radial axis RA in this orientation, piston 16 is at its upper position within cylinder 14.

Figure 8:
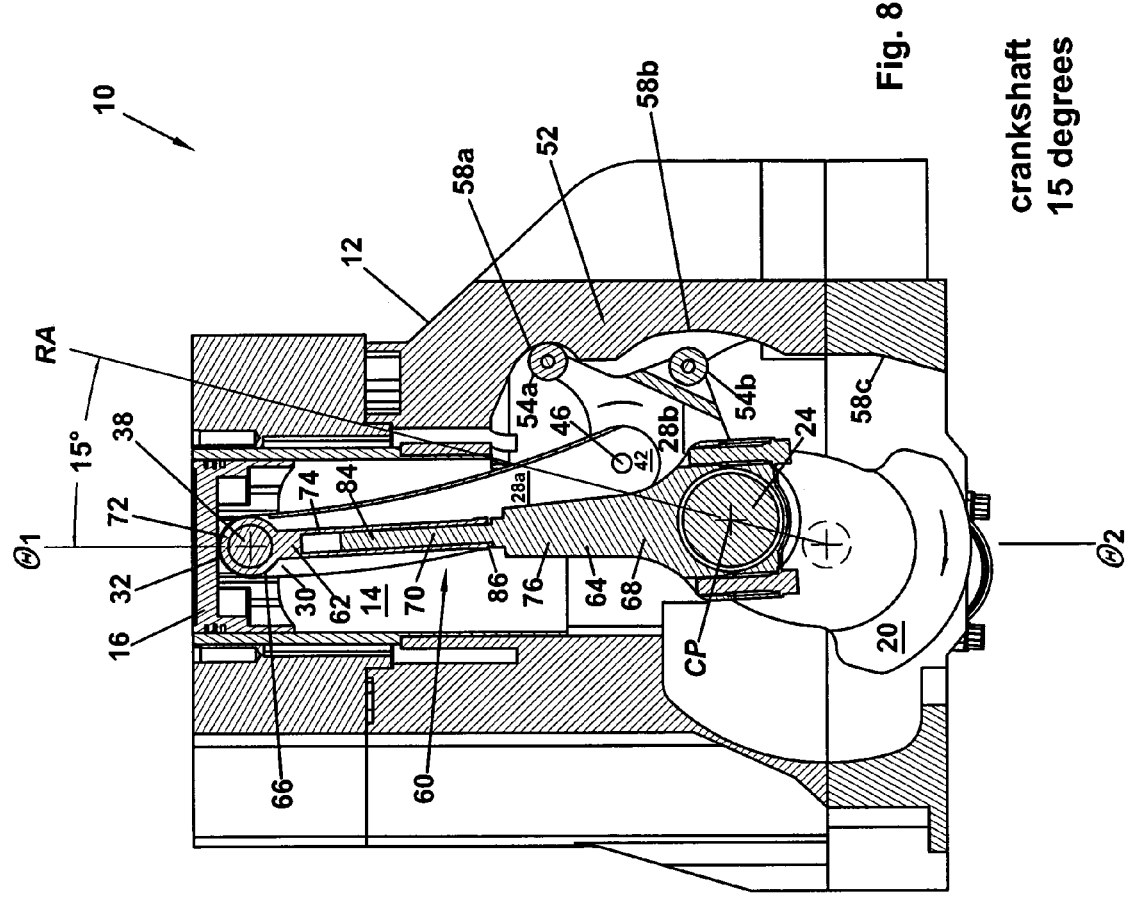
FIG. 8 is a schematic end section view of the exemplary embodiment shown in FIG. 1 with the radial axis angle of the crankshaft shown at 15 degrees.

As shown in FIG. 7, follower 54a of second rod element 28b is in contact with exemplary curvilinear portion 58a of surface 52, such that as crankpin 24 rotates in a clockwise direction as shown in FIG. 8, second rod element 28b tends to rotate, at least initially, in a counterclockwise direction on pin 46, and pin 46 begins to move toward the right. By virtue of being attached to pin 46, proximate end 42 of first rod element 28a also moves to the right. Nevertheless, by virtue of follower 54a following curvilinear portion 58a of surface 52, pin 46 moves slightly upward. As a result, proximate end 42 of first rod element 28a moves slightly upward. Thus, although radial axis RA has rotated 15 degrees past first stroke termination angle $\theta_1$, piston 16 has not moved downward relative to cylinder 14. Indeed, according to some embodiments, piston 16 may move slightly upward (e.g., to a position between about 0.002 inch and about 0.003 inch upward relative to the piston 16's position at 0 degrees). (See the Table below showing an exemplary relationship for exemplary engine 10 between radial axis RA's angle and piston 16's displacement relative to zero degrees past first stroke termination angle $\theta_1$.)

TABLE

RADIAL AXIS RA ANGLE VS. PISTON DISPLACEMENT RELATIVE TO ZERO DEGREES

| Crank Angle | Piston Depth | Crank Angle | Piston Depth |
|---|---|---|---|
| 0 | 0.000 | 92 | 1.674 |
| 4 | 0.000 | 96 | 1.808 |
| 8 | −0.002 | 100 | 1.939 |
| 12 | −0.003 | 104 | 2.066 |
| 16 | −0.002 | 108 | 2.190 |
| 20 | 0.000 | 112 | 2.309 |
| 24 | 0.003 | 116 | 2.423 |
| 28 | 0.020 | 120 | 2.532 |
| 32 | 0.056 | 124 | 2.636 |
| 36 | 0.049 | 128 | 2.733 |
| 40 | 0.050 | 132 | 2.824 |
| 44 | 0.119 | 136 | 2.908 |
| 48 | 0.222 | 140 | 2.989 |
| 52 | 0.338 | 144 | 3.070 |
| 56 | 0.462 | 148 | 3.150 |

TABLE-continued

RADIAL AXIS RA ANGLE VS.
PISTON DISPLACEMENT
RELATIVE TO ZERO DEGREES

| Crank Angle | Piston Depth | Crank Angle | Piston Depth |
|---|---|---|---|
| 60 | 0.590 | 152 | 3.231 |
| 64 | 0.720 | 156 | 3.318 |
| 68 | 0.852 | 160 | 3.414 |
| 72 | 0.987 | 164 | 3.532 |
| 76 | 1.124 | 168 | 3.692 |
| 80 | 1.262 | 172 | 3.816 |
| 84 | 1.400 | 176 | 3.894 |
| 88 | 1.538 | 180 | 3.897 |

Figure 9:
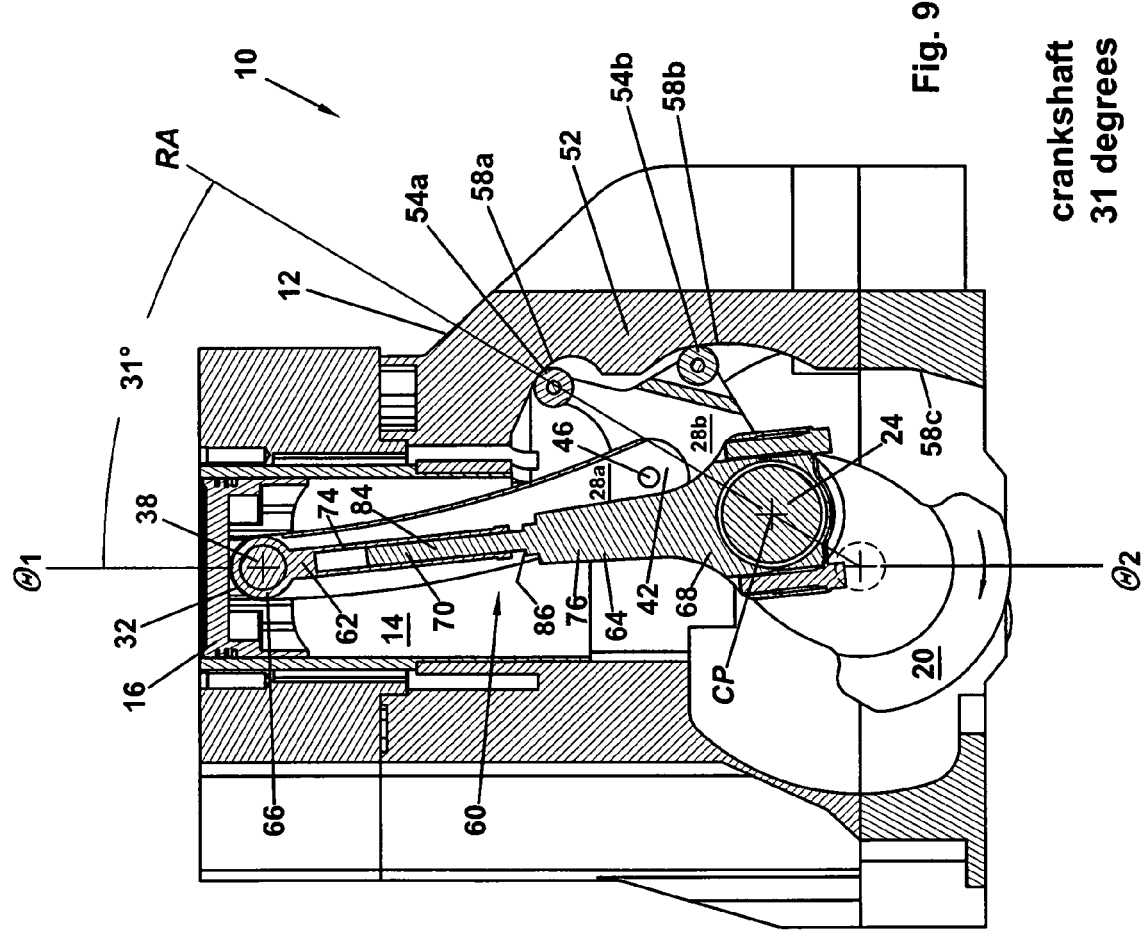
FIG. 9 is a schematic end section view of the exemplary embodiment shown in FIG. 1 with the radial axis angle of the crankshaft shown at 31 degrees.

Referring to FIG. 9, which shows crankshaft 20 in an orientation where radial axis RA has rotated 31 degrees past first stroke termination angle $\theta_1$, follower 54a of second rod element 28b remains in contact with exemplary curvilinear portion 58a of surface 52, such that as crankpin 24 rotates clockwise, second rod element 28b continues to rotate in the counterclockwise direction on pin 46, and pin 46 begins to move slightly downward and toward the right as shown. In addition, second follower 54b has come into contact with second curvilinear portion 58b of surface 52. By virtue of being attached to pin 46, proximate end 42 of first rod element 28a also moves to the right. As a result, proximate end 42 of first rod element 28a moves slightly to the right. Thus, when radial axis RA has rotated 31 degrees past first stroke termination angle $\theta_1$, piston 16 has moved downward relative to cylinder 14 only between about 0.020 inch and about 0.056 inch in the exemplary embodiment shown.

Figure 10:
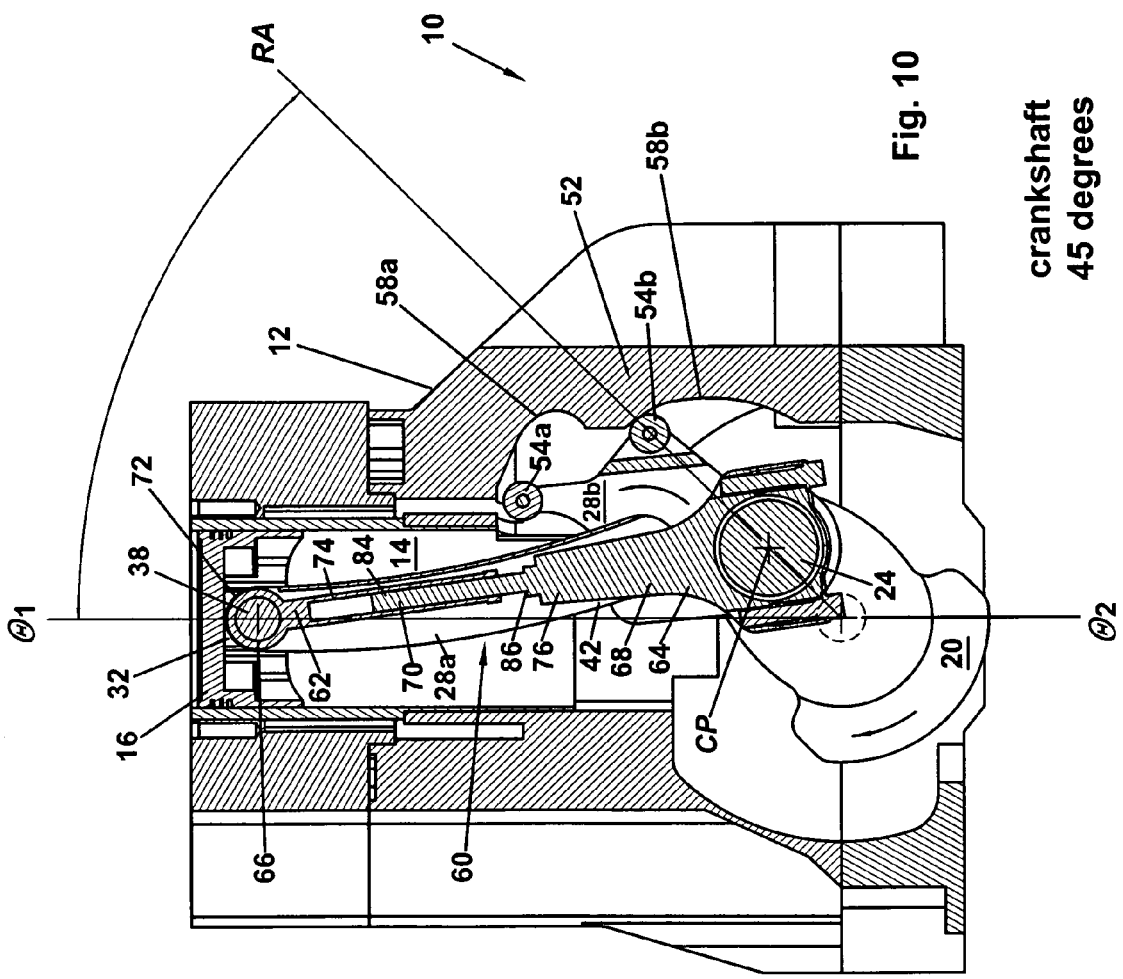
FIG. 10 is a schematic end section view of the exemplary embodiment shown in FIG. 1 with the radial axis angle of the crankshaft shown at 45 degrees.

As shown in FIG. 10, radial axis RA has rotated 45 degrees from first stroke termination angle $\theta_1$. Follower 54a of second rod element 28b has moved out of contact with curvilinear portion 58a, such that only second follower 54b is in contact with surface 52 at second curvilinear portion 58b, and second rod element 28b continues to rotate in the counterclockwise direction on pin 46. Pin 46 begins to move to the left as shown (note that pin 46 cannot be seen in FIG. 10 because it is hidden by second limit member 64 as shown). Proximate end 42 of first rod element 28a also moves to the left. As a result, when radial axis RA has rotated 45 degrees past first stroke termination angle $\theta_1$, piston 16 has moved downward relative to cylinder 14 only between about 0.119 inch and about 0.222 inch in the exemplary embodiment shown. This amount of travel, when viewed in light of the entire stroke length of the exemplary embodiment shown (i.e., about 3.897 inches when radial axis RA has rotated 180 degrees past first stroke termination angle $\theta_1$), results in an exemplary delay of the initiation of the power stroke of piston 16.

Figure 11:
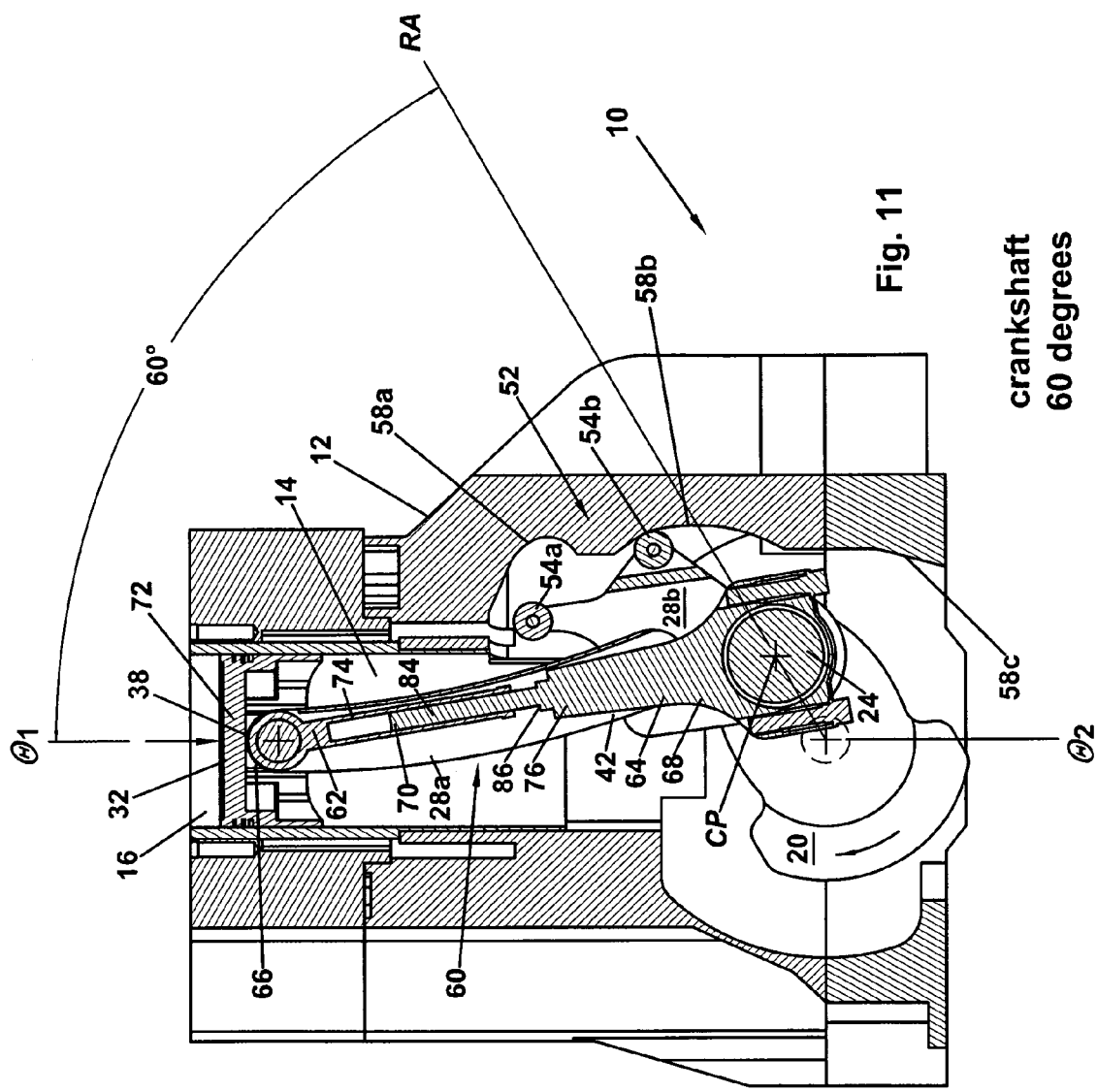
FIG. 11 is a schematic end section view of the exemplary embodiment shown in FIG. 1 with the radial axis angle of the crankshaft shown at 60 degrees.

Referring to FIG. 11, radial axis RA has rotated 60 degrees past first stroke termination angle $\theta_1$, and follower 54a of second rod element 28b remains out of contact with curvilinear portion 58a. Second follower 54b remains in contact with surface 52 at second curvilinear portion 58b, but begins to travel downward as shown. Second rod element 28b, rather than continuing to rotate in the counterclockwise direction on pin 46, has rotated very little and has begun to travel downward on second curvilinear portion 58b of surface 52. Thus, proximate end 42 of first rod element 28a also begins to move downward significantly. As a result, when radial axis RA has rotated 60 degrees from first stroke termination angle $\theta_1$, piston 16 has moved downward relative to cylinder 14 about 0.590 in the exemplary embodiment shown. Thus, whereas during the first 45 degrees of rotation of radial axis RA past first stroke termination angle $\theta_1$, piston 16 traveled downward only between about 0.119 inch and about 0.222 inch, during the next 15 degrees of rotation of radial axis RA, piston 16 travels roughly twice as far down cylinder 14 (i.e., during only a third as much rotation of radial axis RA).

Figure 12:
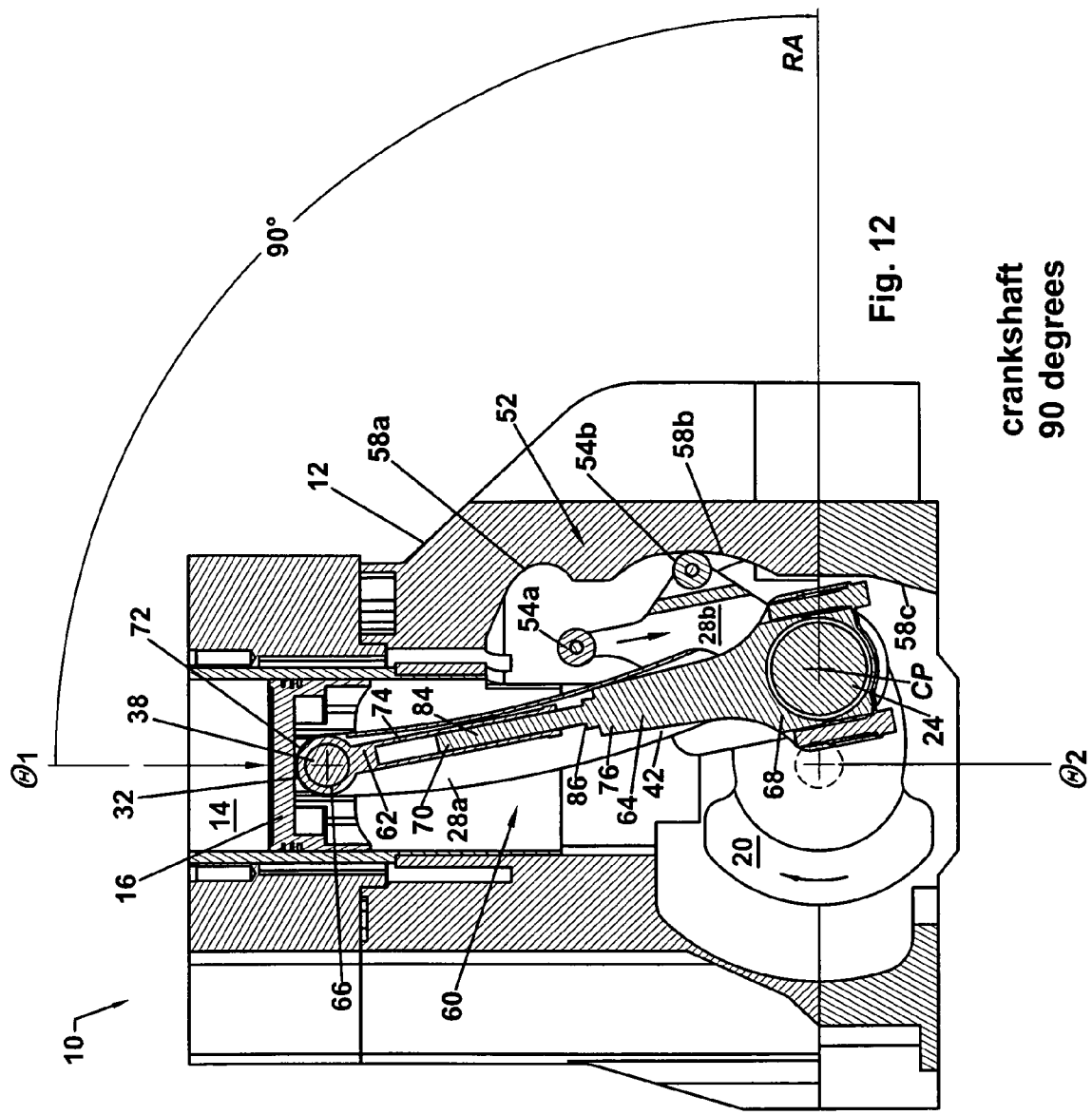
FIG. 12 is a schematic end section view of the exemplary embodiment shown in FIG. 1 with the radial axis angle of the crankshaft shown at 90 degrees.

As shown in FIG. 12, radial axis RA has rotated 90 degrees past first stroke termination angle $\theta_1$, and follower 54a of second rod element 28b remains out of contact with curvilinear portion 58a. Second follower 54b remains in contact with surface 52 at second curvilinear portion 58b, and continues to travel downward. Second rod element 28b continues to not rotate appreciably, and continues to travel downward with second follower 54b contacting second curvilinear portion 58b of surface 52. As a result, when radial axis RA has rotated 90 degrees past first stroke termination angle $\theta_1$, piston 16 has moved downward relative to cylinder 14 between about 1.538 inches and about 1.674 inches in the exemplary embodiment shown.

Figure 13:
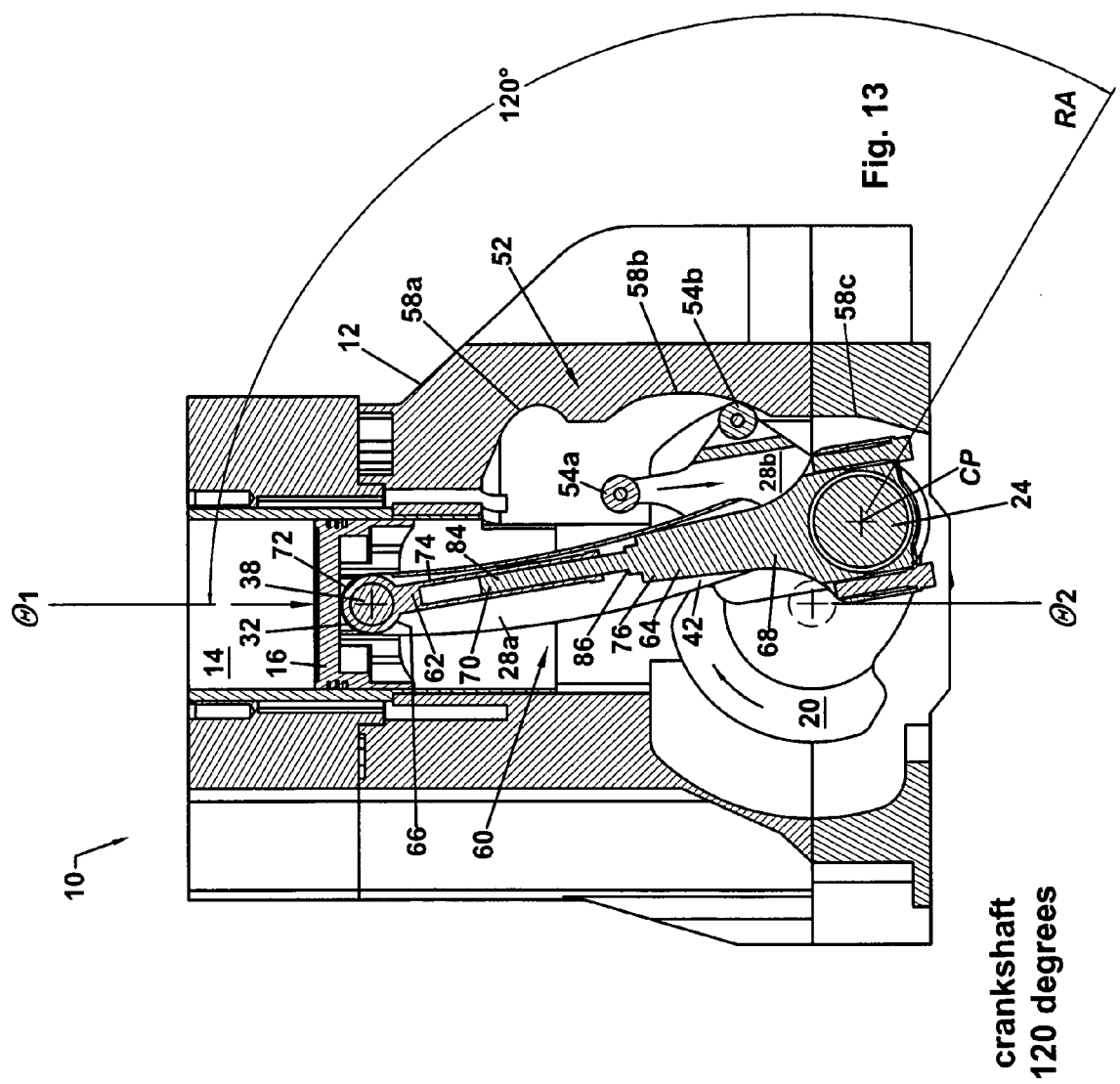
FIG. 13 is a schematic end section view of the exemplary embodiment shown in FIG. 1 with the radial axis angle of the crankshaft shown at 120 degrees.

As shown in FIG. 13, radial axis RA has rotated 120 degrees past first stroke termination angle $\theta_1$, and follower 54a of second rod element 28b remains out of contact with curvilinear portion 58a. Second follower 54b remains in contact with surface 52 at second curvilinear portion 58b, and continues to travel downward as shown. Second rod element 28b continues to not rotate appreciably, and continues to travel downward with second follower 54b contacting second curvilinear portion 58b of surface 52. As a result, when radial axis RA has rotated 120 degrees past first stroke termination angle $\theta_1$, piston 16 has moved downward relative to cylinder 14 about 2.532 inches in the exemplary embodiment shown.

Figure 14:
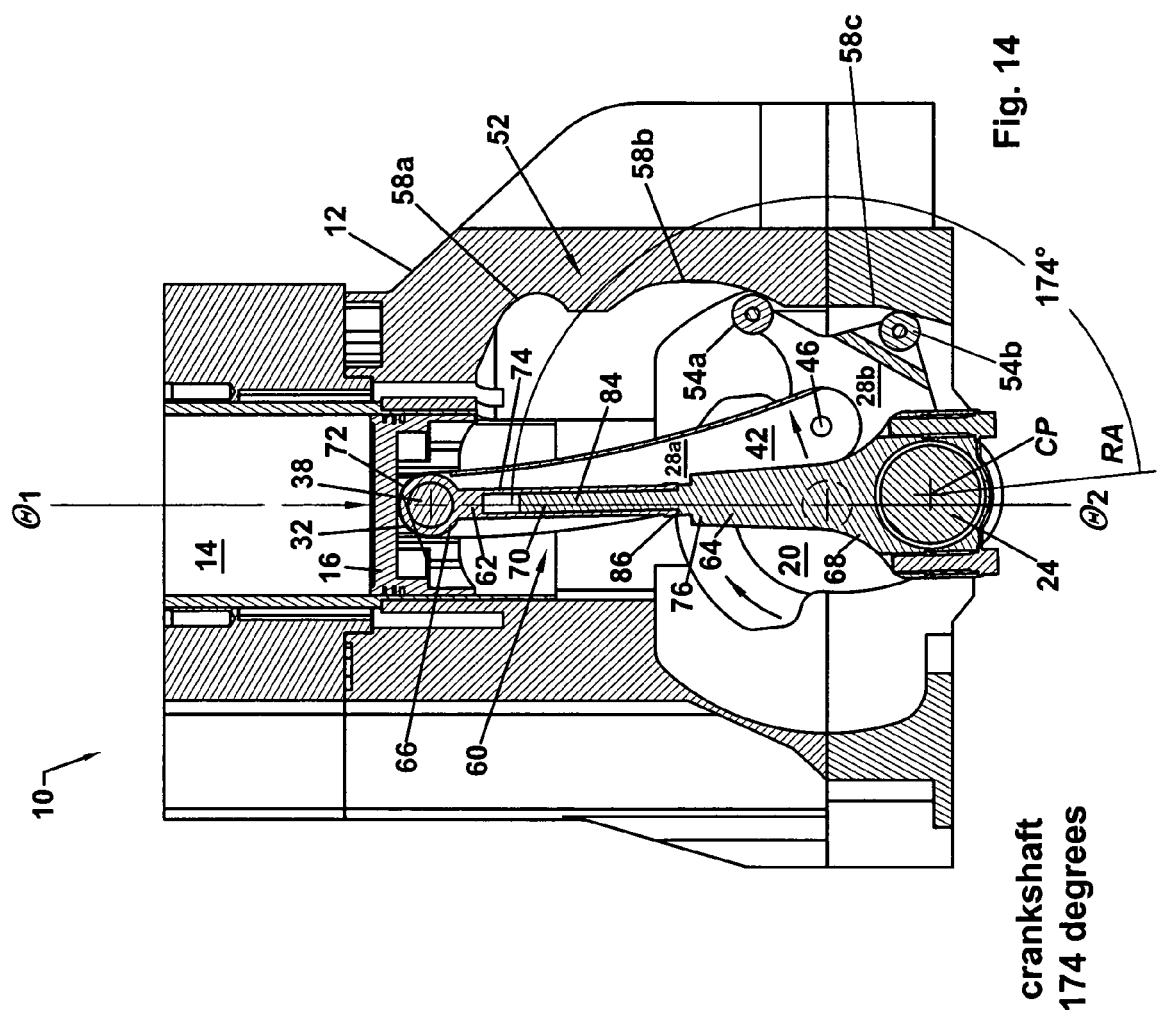
FIG. 14 is a schematic end section view of the exemplary embodiment shown in FIG. 1 with the radial axis angle of the crankshaft shown at 174 degrees.

Referring to FIG. 14, radial axis RA has rotated 174 degrees past first stroke termination angle $\theta_1$, and follower 54a begins to contact second curvilinear portion 58b of surface 52, and second follower 54b rides against third portion 58c of surface 52. As a result, second rod element 28b begins to rotate in the clockwise direction.

In addition, travel limit assembly 60 begins to affect travel of piston 16. In particular, in the exemplary embodiment shown, as crankpin 24 moves left, as shown, both of followers 54a and 54b of second rod element 28b begin to disengage surface 52, and as radial axis RA rotates past 180 degrees and followers 54a and 54b move away from surface 52, motion of second rod element 28b may become unconstrained. Thus, exemplary travel limit assembly 60 may be provided and configured to confine travel of piston 16 between an extended limit and a contracted limit.

For example, as shown in FIG. 14, as radial axis RA approaches 174 degrees past first stroke termination angle $\theta_1$, extension 84 of second limit member 64 extends further into tubular portion 74 in a telescoping manner until an end of tubular portion 74 abuts stop 86 of second limit member 64. This, in turn, prevents piston 16 from traveling further down cylinder 14 than a contracted limit. This also prevents second rod element 28b from continuing to rotate in the clockwise direction and into a position below crankpin 24 as shown. As a result, when radial axis RA has rotated 174 degrees past first stroke termination angle $\theta_1$, as shown in FIG. 14, piston 16 has moved downward relative to cylinder 14 between about 3.816 inches and about 3.894 inches.

Figure 15:
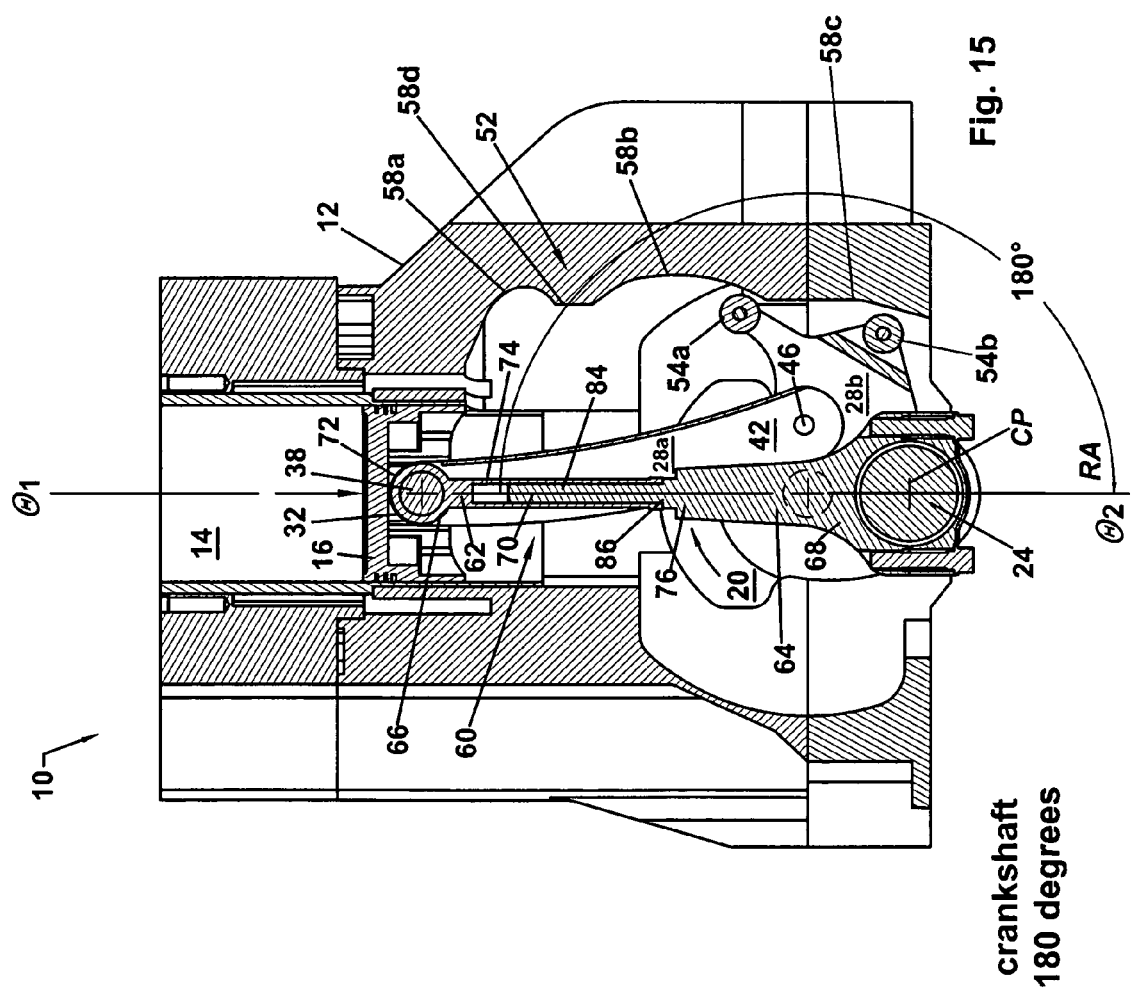
FIG. 15 is a schematic end section view of the exemplary embodiment shown in FIG. 1 with the radial axis angle of the crankshaft shown at 180 degrees.

As shown in FIG. 15, radial axis RA has rotated 180 degrees past first stroke termination angle $\theta_1$ (i.e., at a second stroke termination angle $\theta_2$, which corresponds to the end of the power stroke) and followers 54a and 54b have moved out of contact with surface 52, as second rod element 28b moves to the left as shown. Thus, only travel limit assembly 60 is preventing piston 16 from continuing to travel downward in cylinder 14 past its contracted limit (sometimes referred to as the "bottom" of its stroke). As a result, when radial axis RA has rotated 180 degrees past first stroke termination angle $\theta_1$, piston 16 has moved downward relative to cylinder 14 about 3.897 inches in the exemplary embodiment shown.

Figure 16:
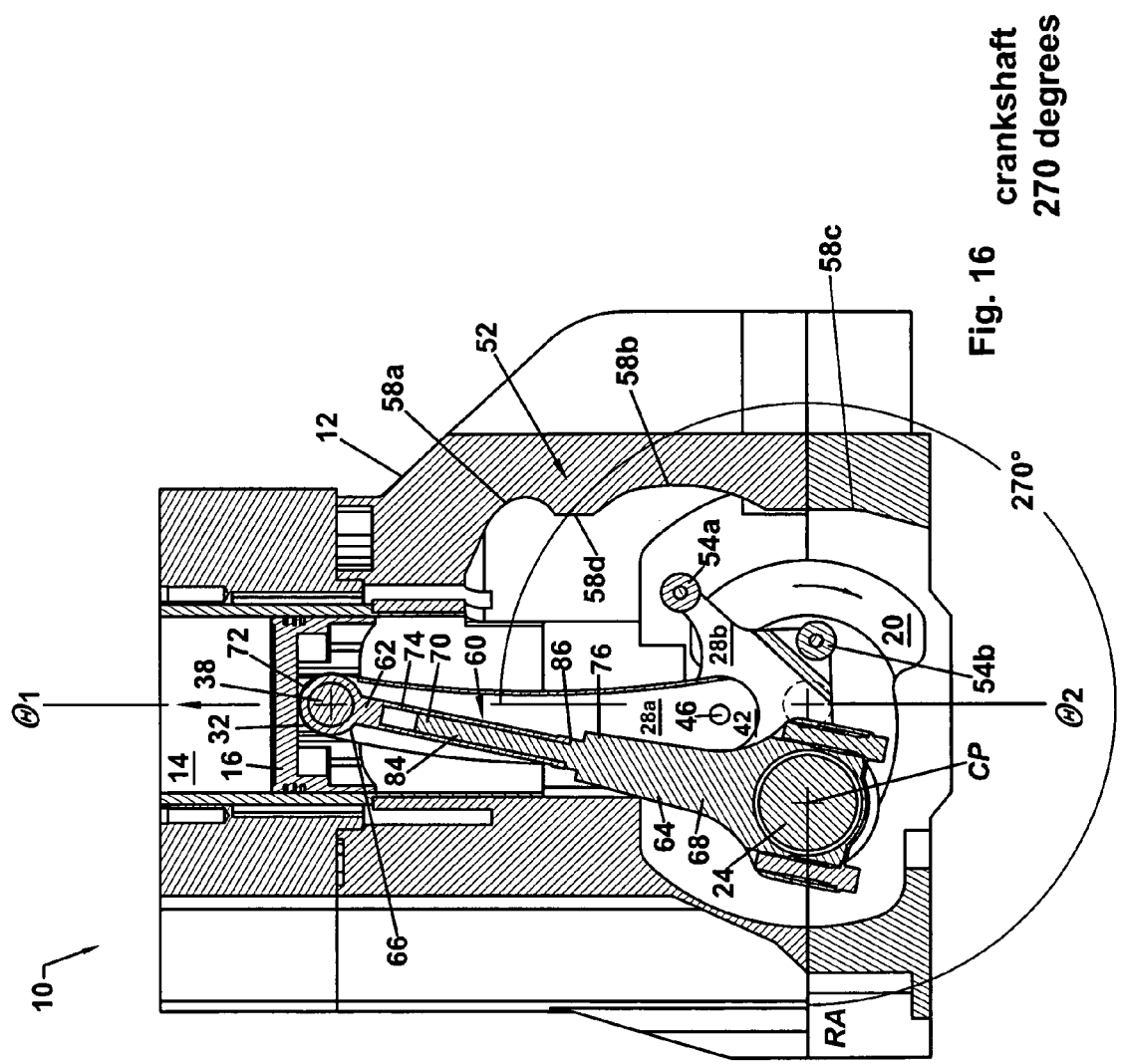
FIG. 16 is a schematic end section view of the exemplary embodiment shown in FIG. 1 with the radial axis angle of the crankshaft shown at 270 degrees.

As shown in FIG. 16, radial axis RA has rotated 270 degrees past first stroke termination angle $\theta_1$, and thus, crankpin 24 has traveled to the left and upward as shown. Second rod element 28b continues to be out of contact with surface 52 and also moves to the left and upward, following the motion of crankpin 24 and continuing to be constrained by travel limit assembly 60, with the end of tubular portion 74 abutting against stop 86 of second limit member 64. Thus, any downward load on piston 16 as piston 16 travels upward is taken by travel limit assembly 60, which serves to push piston 16 upward, as shown, by virtue of being driven upward by crankpin 24.

Figure 17:
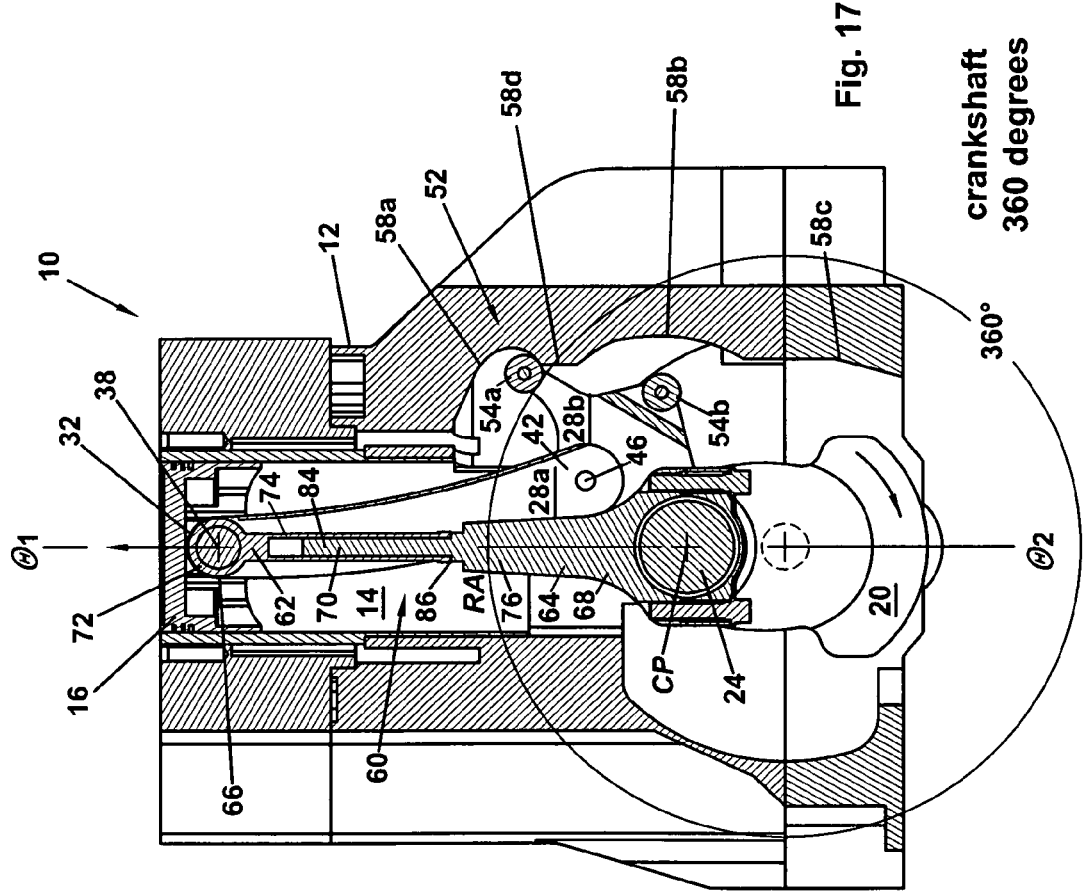
FIG. 17 is a schematic end section view of the exemplary embodiment shown in FIG. 1 with the radial axis angle of the crankshaft shown at 0/360 degrees.

Referring to FIG. 17, radial axis RA has rotated 360 degrees past first stroke termination angle $\theta_1$, and thus, crankpin 24 has traveled back to first stroke termination angle $\theta_1$. With radial axis RA in this orientation, piston 16 has returned to its upper position within cylinder 14, or its extended limit. Follower 54a of second rod element 28b has returned to contact exemplary curvilinear portion 58a of surface 52. Thus, the motion of second rod element 28b becomes constrained by surface 52. The end of tubular portion 74 of first limit member 62 continues to abut stop 86 of second limit member 64. However, as shown in FIG. 8, as radial axis RA moves past first stroke termination angle $\theta_1$, extension 84 of second limit member 64 begins to pull slightly out of tubular portion 74 in a telescoping manner. As shown in FIGS. 9-13, extension 84 of second limit member 64 continues to be partially pulled out of tubular portion 74, as radial axis RA continues from 31 degrees past first stroke termination angle $\theta_1$, until radial axis RA approaches about 180 degrees past first stroke termination angle $\theta_1$ (see FIGS. 14 and 15).

In this exemplary manner, the effective length of connecting rod 28 is variable, such that the distance between the center of pin 38, which operably couples connecting rod 28 to piston 16, and the center of crankpin 24 is variable. For example, the distance between first end aperture 32 of distal end 30 of first rod element 28a, and the center of aperture 50 of proximate end 44 of second rod element 28b is variable (see, e.g., FIGS. 6-15), the variability of the effective length being facilitated in the exemplary embodiment by virtue of first rod element 28a and second rod element 28b being pivotally coupled to one another. Specifically, as radial axis RA rotates between first stroke termination angle $\theta_1$ and 180 degrees past first stroke termination angle $\theta_1$ (i.e., to second stroke termination angle $\theta_2$), the effective length initially increases, thereby delaying initiation of the power stroke, for example, until radial axis RA reaches a point 45 degrees past first stroke termination angle $\theta_1$ in the exemplary embodiment shown. Thereafter, the effective length decreases as radial axis RA continues to rotate toward an orientation 180 degrees past first stroke termination angle $\theta_1$.

According to some embodiments, the exemplary configuration and/or interaction can be tailored to achieve desired performance characteristics of exemplary engine 10, such as, for example, improved efficiency, improved power output, improved responsiveness, and/or improved torque. For example, the configuration of first rod element 28a, second rod element 28b, followers 54a and/or 54b, and/or cross-sectional profile 56 of surface 52 may be tailored to improve efficiency and/or power of exemplary engine 10, for example, by changing at least one of the timing and magnitude of the delay of initiation of the power stroke.

According to some embodiments, initiation of the power stroke of exemplary engine 10 may be delayed until crankshaft 20 has rotated at least about 15 degrees beyond the first stroke termination angle $\theta_1$. In other embodiments, initiation of the power stroke may be delayed until crankshaft 20 has rotated at least about 30 degrees beyond the first stroke termination angle $\theta_1$ (e.g., at least about 40 or 45 degrees beyond the first stroke termination angle $\theta_1$. In other embodiments, rotation may be set to about 25 or 35 degrees beyond the first stroke termination angle $\theta_1$, for example, to achieve a desired performance characteristic of engine 10.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. An internal combustion engine comprising:
a cylinder block defining a cylinder;
a surface associated with the cylinder block;
a crankshaft defining a crankpin, wherein the crankshaft is rotatably received by the cylinder block and rotates about a longitudinal axis;
a piston configured to reciprocate within the cylinder; and
a connecting rod operably coupled to the piston and the crankpin, wherein the connecting rod comprises a first distal end operably coupled to the piston and a second proximate end operably coupled to the crankpin, wherein the connecting rod comprises:
a first rod element comprising the first distal end operably coupled to the piston, and a first proximate end, a second rod element pivotally coupled to the first rod element, the second rod element comprising a second distal end operably coupled to the first proximate end of the first rod element, and the second proximate end operably coupled to the crankpin, and at least one follower associated with the second rod element, wherein the first distal end and the second proximate end define an effective length of the connecting rod, wherein the connecting rod is configured such that the effective length of the connecting rod is variable, wherein the at least one follower is configured to interact with the surface associated with the cylinder block and affect the pivoting motion of the first rod element relative to the second rod element, and wherein the at least one follower intermittently contacts the surface during operation of the engine.

2. The engine of claim 1, wherein the surface is defined by an interior surface of the cylinder block.

3. The engine of claim 1, wherein the surface defines a cross-sectional profile.

4. The engine of claim 1, wherein the at least one follower comprises two followers.

5. The engine of claim 1, wherein the at least one follower is coupled directly to the second rod element.

6. The engine of claim 1, wherein the surface defines a cross-sectional profile, wherein the profile is configured to improve efficiency of the engine.

7. The engine of claim 1, wherein the surface defines a cross-sectional profile, wherein the profile is configured to improve power output of the engine.

8. The engine of claim 1, further comprising a travel limit assembly configured to confine travel of the piston between an extended limit and a contracted limit.

9. The engine of claim 8, wherein the travel limit assembly comprises a first limit member and a second limit member, wherein the first limit member is operably coupled to at least one of the piston and the first rod element, and the second limit member is operably coupled to the first limit member and the crankpin.

10. The engine of claim 9, wherein the first limit member and the second limit member are coupled to one another such that a length of the travel limit assembly is variable between a minimum extent and a maximum extent.

11. The engine of claim 9, wherein the first limit member and the second limit member are coupled to one another in a telescoping manner.

12. The engine of claim 8, wherein the first rod element is configured to provide clearance for the travel limit assembly.

13. The engine of claim 12, wherein the connecting rod defines space through which the first limit member passes.

14. The engine of claim 1, wherein the crankpin defines a longitudinal axis parallel to and offset by a distance with respect to the longitudinal axis about which the crankshaft rotates, wherein a line extending between the longitudinal axis about which the crankshaft rotates and the longitudinal axis of the crankpin defines a radial axis of the crankshaft, wherein rotation of the crankshaft results in reciprocating movement of the piston within the cylinder via the connecting rod, the reciprocating movement defining:

a compression stroke terminating when the radial axis of the crankshaft is substantially aligned with a longitudinal axis defined by the cylinder at a first stroke termination angle and the crankpin is located proximate the cylinder with respect to the longitudinal axis defined by the crankshaft, and a power stroke terminating when the radial axis of the crankshaft is substantially aligned with the longitudinal axis defined by the cylinder at a second stroke termination angle and the crankpin is located distal the cylinder with respect to the longitudinal axis defined by the crankshaft, and wherein the effective length of the connecting rod is configured to vary, such that initiation of the power stroke is delayed until after the radial axis of the crankshaft has passed the first stroke termination angle by a predetermined amount, the predetermined amount being greater than 15 degrees.

15. The engine of claim 14, wherein the predetermined amount is at least 30 degrees.

16. The engine of claim 14, wherein the predetermined amount is at least 45 degrees.

17. An internal combustion engine comprising:

a cylinder block defining a cylinder;

a surface associated with the cylinder block;

a crankshaft defining a crankpin, wherein the crankshaft is rotatably received by the cylinder block and rotates about a longitudinal axis of the crankshaft;

a piston configured to reciprocate within the cylinder; and a connecting rod operably coupled to the piston and the crankpin, wherein the connecting rod comprises a first distal end operably coupled to the piston and a second proximate end operably coupled to the crankpin, wherein the connecting rod comprises:

a first rod element comprising the first distal end operably coupled to the piston, and a first proximate end, a second rod element pivotally coupled to the first rod element, the second rod element comprising a second distal end operably coupled to the first proximate end of the first rod element, and the second proximate end operably coupled to the crankpin, and at least one follower associated with the second rod element, wherein the first distal end and the second proximate end define an effective length of the connecting rod, wherein the connecting rod is configured such that the effective length of the connecting rod is variable, wherein the at least one follower is configured to interact with the surface associated with the cylinder block and affect the pivoting motion of the first rod element relative to the second rod element, wherein the surface associated with the cylinder block defines a cross-sectional profile as viewed along the longitudinal axis of the crankshaft, and wherein the cross-sectional profile comprises a curvilinear portion.

18. The engine of claim 17, wherein the surface is defined by an interior surface of the cylinder block.

19. The engine of claim 17, wherein the at least one follower comprises two followers.

20. The engine of claim 17, wherein the at least one follower is coupled directly to the second rod element.

21. The engine of claim 17, wherein the cross-sectional profile is configured to improve efficiency of the engine.

22. The engine of claim 17, wherein the cross-sectional profile is configured to improve power output of the engine.

23. The engine of claim 17, further comprising a travel limit assembly configured to confine travel of the piston between an extended limit and a contracted limit.

24. The engine of claim 23, wherein the travel limit assembly comprises a first limit member and a second limit member, wherein the first limit member is operably coupled to at least one of the piston and the first rod element, and the second limit member is operably coupled to the first limit member and the crankpin.

25. The engine of claim 24, wherein the first limit member and the second limit member are coupled to one another such that a length of the travel limit assembly is variable between a minimum extent and a maximum extent.

26. The engine of claim 24, wherein the first limit member and the second limit member are coupled to one another in a telescoping manner.

27. The engine of claim 23, wherein the first rod element is configured to provide clearance for the travel limit assembly.

28. The engine of claim 27, wherein the connecting rod defines space through which the first limit member passes.

29. The engine of claim 17, wherein the crankpin defines a longitudinal axis parallel to and offset by a distance with respect to the longitudinal axis about which the crankshaft rotates,
wherein a line extending between the longitudinal axis about which the crankshaft rotates and the longitudinal axis of the crankpin defines a radial axis of the crankshaft,
wherein rotation of the crankshaft results in reciprocating movement of the piston within the cylinder via the connecting rod, the reciprocating movement defining:
a compression stroke terminating when the radial axis of the crankshaft is substantially aligned with a longitudinal axis defined by the cylinder at a first stroke termination angle and the crankpin is located proximate the cylinder with respect to the longitudinal axis defined by the crankshaft, and
a power stroke terminating when the radial axis of the crankshaft is substantially aligned with the longitudinal axis defined by the cylinder at a second stroke termination angle and the crankpin is located distal the cylinder with respect to the longitudinal axis defined by the crankshaft, and
wherein the effective length of the connecting rod is configured to vary, such that initiation of the power stroke is delayed until after the radial axis of the crankshaft has passed the first stroke termination angle by a predetermined amount, the predetermined amount being greater than 15 degrees.

30. The engine of claim 29, wherein the predetermined amount is at least 30 degrees.

31. The engine of claim 29, wherein the predetermined amount is at least 45 degrees.

32. An internal combustion engine comprising:
a cylinder block defining a cylinder having a longitudinal axis;
a surface associated with the cylinder block;
a crankshaft defining a crankpin, wherein the crankshaft is rotatably received by the cylinder block and rotates about a longitudinal axis of the crankshaft;
a piston configured to reciprocate within the cylinder; and
a connecting rod operably coupled to the piston and the crankpin, wherein the connecting rod comprises a first distal end operably coupled to the piston and a second proximate end operably coupled to the crankpin, wherein the connecting rod comprises:
a first rod element comprising the first distal end operably coupled to the piston, and a first proximate end,
a second rod element pivotally coupled to the first rod element, the second rod element comprising a second distal end operably coupled to the first proximate end of the first rod element, and the second proximate end operably coupled to the crankpin, and
at least one follower associated with the second rod element,
wherein the first distal end and the second proximate end define an effective length of the connecting rod,
wherein the connecting rod is configured such that the effective length of the connecting rod is variable,
wherein the at least one follower is configured to interact with the surface associated with the cylinder block and affect the pivoting motion of the first rod element relative to the second rod element, and
wherein the longitudinal axis of the crankshaft is aligned with the longitudinal axis of the cylinder.

33. The engine of claim 32, wherein the surface is defined by an interior surface of the cylinder block.

34. The engine of claim 32, wherein the surface defines a cross-sectional profile.

35. The engine of claim 32, wherein the at least one follower comprises two followers.

36. The engine of claim 32, wherein the at least one follower is coupled directly to the second rod element.

37. The engine of claim 32, wherein the surface defines a cross-sectional profile, wherein the profile is configured to improve efficiency of the engine.

38. The engine of claim 32, wherein the surface defines a cross-sectional profile, wherein the profile is configured to improve power output of the engine.

39. The engine of claim 32, further comprising a travel limit assembly configured to confine travel of the piston between an extended limit and a contracted limit.

40. The engine of claim 39, wherein the travel limit assembly comprises a first limit member and a second limit member, wherein the first limit member is operably coupled to at least one of the piston and the first rod element, and the second limit member is operably coupled to the first limit member and the crankpin.

41. The engine of claim 40, wherein the first limit member and the second limit member are coupled to one another such that a length of the travel limit assembly is variable between a minimum extent and a maximum extent.

42. The engine of claim 40, wherein the first limit member and the second limit member are coupled to one another in a telescoping manner.

43. The engine of claim 39, wherein the first rod element is configured to provide clearance for the travel limit assembly.

44. The engine of claim 43, wherein the connecting rod defines space through which the first limit member passes.

45. The engine of claim 32, wherein the crankpin defines a longitudinal axis parallel to and offset by a distance with respect to the longitudinal axis about which the crankshaft rotates,
wherein a line extending between the longitudinal axis about which the crankshaft rotates and the longitudinal axis of the crankpin defines a radial axis of the crankshaft,
wherein rotation of the crankshaft results in reciprocating movement of the piston within the cylinder via the connecting rod, the reciprocating movement defining:
a compression stroke terminating when the radial axis of the crankshaft is substantially aligned with a longitudinal axis defined by the cylinder at a first stroke termination angle and the crankpin is located proximate the cylinder with respect to the longitudinal axis defined by the crankshaft, and
a power stroke terminating when the radial axis of the crankshaft is substantially aligned with the longitudinal axis defined by the cylinder at a second stroke termination angle and the crankpin is located distal the cylinder with respect to the longitudinal axis defined by the crankshaft, and wherein the effective length of the connecting rod is configured to vary, such that initiation of the power stroke is delayed until after the radial axis of the crankshaft has passed the first stroke termination angle by a predetermined amount, the predetermined amount being greater than 15 degrees.

46. The engine of claim 45, wherein the predetermined amount is at least 30 degrees.

47. The engine of claim 45, wherein the predetermined amount is at least 45 degrees.

* * * * *